(12) United States Patent  
Rajasingam et al.

(10) Patent No.: US 9,199,301 B2
(45) Date of Patent: Dec. 1, 2015

(54) APPARATUS FOR FABRICATING A WIND TURBINE BLADE AND RELATED METHOD

(75) Inventors: Damien Rajasingam, Cowes (GB); Richard Evans, Cowes (GB); Olav Davis, Hamble (GB); Stephen Sandercock, Ryde (GB)

(73) Assignee: Vestas Wind Systems A/S, Aarhus N. (DK)

( * ) Notice: Subject to any disclaimer, the term of this patent is extended or adjusted under 35 U.S.C. 154(b) by 431 days.

(21) Appl. No.: 13/816,187

(22) PCT Filed: Aug. 4, 2011

(86) PCT No.: PCT/DK2011/050301
§ 371 (c)(1),
(2), (4) Date: May 23, 2013

(87) PCT Pub. No.: WO2012/019610
PCT Pub. Date: Feb. 16, 2012

(65) Prior Publication Data
US 2013/0239379 A1    Sep. 19, 2013

Related U.S. Application Data

(60) Provisional application No. 61/372,598, filed on Aug. 11, 2010.

(30) Foreign Application Priority Data

Sep. 3, 2010 (DK) .................................. 2010 70384

(51) Int. Cl.
*B21K 3/04* (2006.01)
*B29C 33/12* (2006.01)
(Continued)

(52) U.S. Cl.
CPC . *B21K 3/04* (2013.01); *B29C 33/12* (2013.01); *B29C 65/5057* (2013.01);
(Continued)

(58) Field of Classification Search
CPC .... B21K 3/04; B29C 66/543; B29C 65/7832; B29C 65/5057; B29C 66/8324; B29C 65/5092; B29C 70/86; B29C 65/5071; B29C 66/721; B29C 33/12; B29C 66/128; B29C 66/636; B29C 66/301; B29D 99/028; F03D 1/0683; Y10T 29/03
See application file for complete search history.

(56) References Cited

U.S. PATENT DOCUMENTS 3,799,700 A    3/1974   Broekhuizen et al.
8,012,299 B2 *  9/2011   Hancock ................. F03D 1/001
                                                 156/228
(Continued)

FOREIGN PATENT DOCUMENTS

CN    101749194 A    6/2010
DE       2166396 A    3/1974
(Continued)

OTHER PUBLICATIONS

European Patent Office, Office Action issued in corresponding EP Application No. 11743423.3-1703 dated Oct. 24, 2014, 4 pages.
(Continued)

*Primary Examiner* — Ryan J Walters
(74) *Attorney, Agent, or Firm* — Wood, Herron & Evans, LLP (57) ABSTRACT

An apparatus (60) is provided for forming a trailing edge (52) of a wind turbine blade having first and second shells (40, 42). The first and second shells define a gap therebetween, and the apparatus has a first mold component (62) that is adapted to form the first or second shell, and an engaging element (77). The engaging element is configured to securely support a trailing edge component to be coupled to the first and second shells. The engaging element is coupled to the first mold component. The apparatus may additionally include a second mold component (64) that is adapted to form the other of the first or second shells and which is coupled to the first mold component. In this embodiment, the first and second mold components have a closed position in which the first and second shells are closed over one another so as to define a generally closed profile of the wind turbine blade.

19 Claims, 6 Drawing Sheets

(51) Int. Cl.
  *B29C 65/50* (2006.01)
  *B29C 65/78* (2006.01)
  *B29C 65/00* (2006.01)
  *B29D 99/00* (2010.01)
  *F03D 1/06* (2006.01)
  *B29L 31/08* (2006.01)
  *B29C 65/48* (2006.01)

(52) U.S. Cl.
  CPC ........ *B29C 65/5071* (2013.01); *B29C 65/5092* (2013.01); *B29C 65/7832* (2013.01); *B29C 66/128* (2013.01); *B29C 66/301* (2013.01); *B29C 66/543* (2013.01); *B29C 66/636* (2013.01); *B29C 66/721* (2013.01); *B29C 66/8324* (2013.01); *B29D 99/0028* (2013.01); *F03D 1/0683* (2013.01); *B29C 65/483* (2013.01); *B29C 66/7212* (2013.01); *B29L 2031/085* (2013.01); *Y02E 10/721* (2013.01); *Y10T 29/37* (2015.01); *Y10T 29/49336* (2015.01)

(56) References Cited

U.S. PATENT DOCUMENTS

2008/0277834 A1* 11/2008 Schibsbye ............... B29C 33/26
  264/334
2011/0067795 A1* 3/2011 Hancock ................. F03D 1/001
  156/60

FOREIGN PATENT DOCUMENTS

| DE | 102008038620 A1 | 12/2009 |
| EP | 0171325 A1 | 2/1986 |
| WO | 2007054088 A1 | 5/2007 |
| WO | 2009109619 A2 | 9/2009 |

OTHER PUBLICATIONS

Danish Patent Office, Search Report issued in corresponding DK Application No. PA 2010 70384 dated Apr. 15, 2011, 6 pages.
International Searching Authority, Search Report and Written Opinion issued in corresponding PCT/DK2011/050301 dated Nov. 7, 2011, 12 pages.

* cited by examiner

APPARATUS FOR FABRICATING A WIND TURBINE BLADE AND RELATED METHOD

TECHNICAL FIELD

The present invention relates generally to wind turbines and, more particularly, to apparatus and methods for fabricating a wind turbine blade.

BACKGROUND

Wind turbines are known to generate their highest yield (i.e., operating efficiency) under predetermined aerodynamic conditions of their blades. In this regard, the blades of a wind turbine are designed with a predetermined profile. In a typical blade construction, a portion of the blade proximate the root end is formed with a gap, at the trailing edge, between the two opposed faces of the blade. In typical blade constructions, therefore, an additional component may be added to the trailing edge of the blade, so as to close the gap, thereby yielding a blade having a closed cross-sectional profile.

Known methods for adding the additional trailing edge component tend to be complicated and labor-intensive. There is a need, therefore, for apparatuses and related methods providing for formation of a trailing edge of a wind turbine blade with relative ease and efficiency.

SUMMARY

In one embodiment, an apparatus is provided for forming a trailing edge of a wind turbine blade having first and second shells. The first and second shells define a gap therebetween, and the apparatus has a first mold component that is adapted to form the first or second shell, and an engaging element. The engaging element is configured to securely support a trailing edge component to be coupled to the first and second shells. The engaging element is coupled to the first mold component. The apparatus may additionally include a second mold component that is adapted to form the other of the first or second shells and which is coupled to the first mold component. In this embodiment, the first and second mold components have a closed position in which the first and second shells are closed over one another so as to define a generally closed profile of the wind turbine blade. The first and second mold components are, in one embodiment, pivotally coupled to one another. The engaging element may be positioned between the first and second mold components in the closed position or, alternatively, the engaging element may be positioned outside of the first and second mold components in the closed position.

The engaging element may be releasably coupled to the first mold component. The apparatus may also include a first adjustment mechanism that is operatively coupled to the engaging element for positioning the trailing edge component relative to the first and second shells of the wind turbine blade. The first adjustment mechanism may be configured to control a position of a trailing edge component along a first direction that is transverse to a longitudinal extension of the wind turbine blade. Additionally, the apparatus may include a second adjustment mechanism that is operatively coupled to the engaging element and which is configured to control a position of the trailing edge component along a second direction that is transverse to the first direction.

In a specific embodiment, the first adjustment mechanism is manually operated and may include, for example, a sliding guide, a jacking bolt, a set screw or bolt, and/or other mechanism that provides manual adjustment of the engaging element. The engaging element may include one of a vacuum element or a clamp for securely supporting the trailing edge component relative to the engaging element. The engaging element may have a surface that is configured to conform to the shape of the trailing edge component, and have one of an arcuate shape, a generally flat shape, or a general V shape. The engaging element may also have a varying cross-sectional profile along its length.

In another embodiment, a method is provided for closing a gap between first and second shells at the trailing edge of a wind turbine blade. The method includes forming the first shell in a first mold component. A trailing edge component of the wind turbine blade is supported with a positioning apparatus that is at least partially coupled to the first mold component. The method may, additionally or alternatively, include adjusting a position of the trailing edge component by actuating an adjustment mechanism of the positioning apparatus. The method may also include forming the second shell in a second mold component, and moving the second mold component over the first mold component to thereby define a generally closed profile of the wind turbine blade formed from the first and second shells. By way of example, the method may include pivotally moving the first and second mold components relative to one another. In a specific embodiment, the method includes securing the trailing edge component relative to the engaging element while the engaging element is coupled to the first mold component. In an alternative embodiment, the method includes securing the trailing edge component relative to the engaging element while the engaging element is decoupled from the first mold component.

In yet another embodiment, a trailing edge component is provided for closing a gap between a pair of shells of a wind turbine blade. The trailing edge component includes a central member that has a predetermined height, and a pair of flange portion members that are coupled to respective ends of the central member. A pair of curved portions are located at the intersection of the central member and each of the flange portion members, with at least one of the curved portion members having a radius of curvature, along a longitudinal portion of the trailing edge component, that is at least about 10% of the predetermined height of the central member. The radius of curvature may be at least about 20% of the predetermined height of the central member. In a specific embodiment, the trailing edge component extends along a longitudinal dimension of the wind turbine blade, and has a varying cross-sectional profile along that longitudinal dimension.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
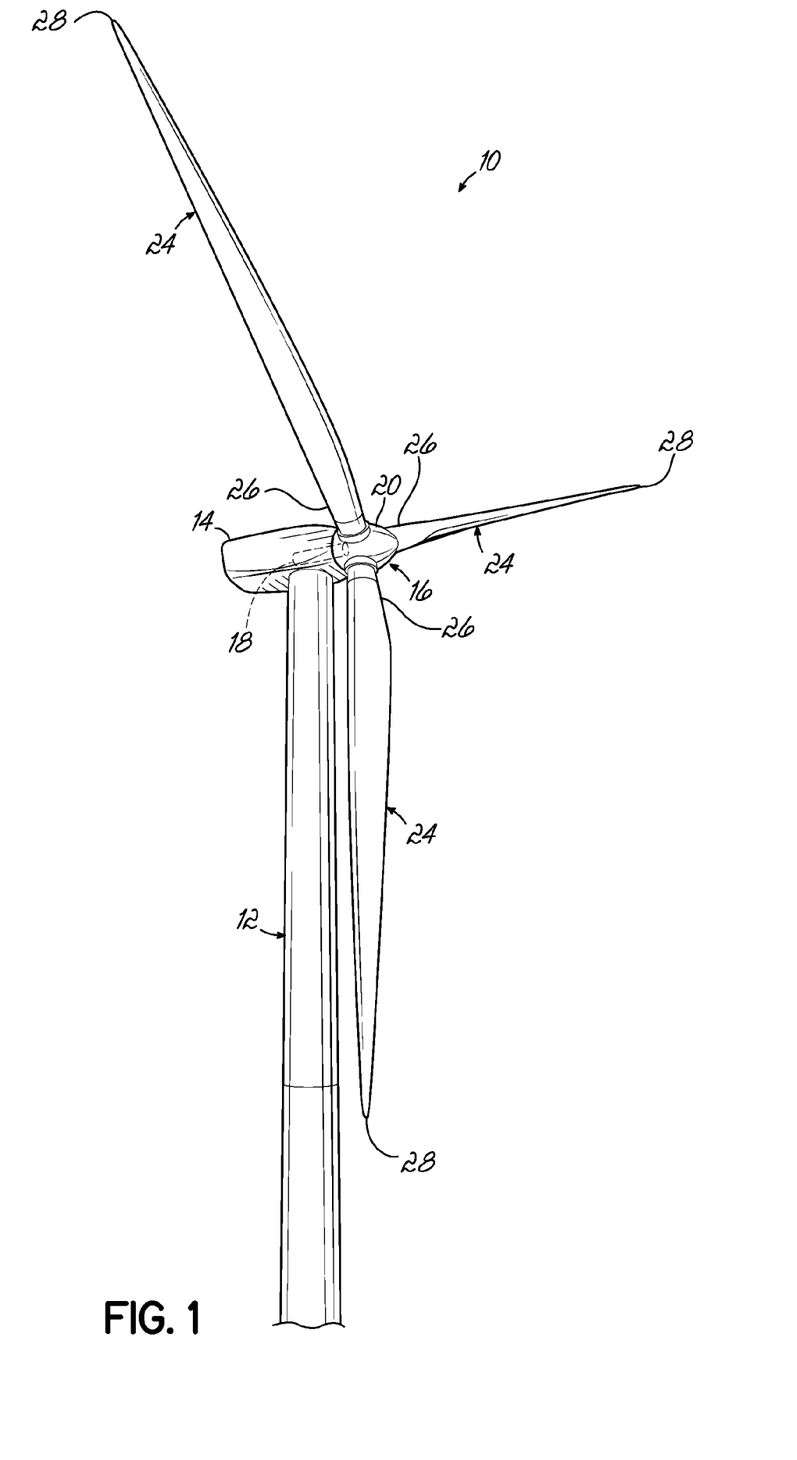
FIG. 1 is a perspective view of a wind turbine.

With reference to the figures, and more specifically to FIG. 1, an exemplary wind turbine 10 includes a tower 12, a nacelle 14 at the apex of the tower 12, and a rotor 16 operatively coupled to a generator 18 housed inside the nacelle 14. The wind turbine 10, which is represented as a horizontal-axis wind turbine, has the ability to convert the kinetic energy of the wind into electrical energy. In addition to the generator 18, nacelle 14 houses various components needed to convert the wind energy into electrical energy and also various components needed to operate and optimize the performance of the wind turbine 10. The tower 12 supports the load presented by the nacelle 14, rotor 16, and other wind turbine components housed inside the nacelle 14. The tower 12 of the wind turbine 10 operates to elevate the nacelle 14 and rotor 16 to a height above ground level or sea level, as may be the case, at which wind with faster moving air characterized by smoother and less turbulent air currents is typically found.

The rotor 16 includes a central hub 20 and a plurality of blades 24 coupled to and extending outwardly from the central hub 20 at locations distributed about the circumference of the central hub 20. In the representative embodiment, the rotor 16 includes three blades 24. The blades 24 are configured to interact with the passing air flow to produce lift that causes the rotor 16 to spin about its longitudinal axis. Each of the blades 24 may be connected to the central hub 20 through a pitch mechanism that allows the blade to pitch under control of a pitch controller (not shown). Wind exceeding a minimum level will activate the rotor 16 and allow it to rotate in a substantially perpendicular direction to the wind. The rotation movement is converted to electric power by the generator 18 and is usually supplied to the utility grid as known to a person having ordinary skill in the art.

With continued reference to FIG. 1, and further referring to FIGS. 2 and 3A-3D, a blade 24 of the wind turbine 10 has a root end 26 adjacent the central hub 20, a tip end 28 longitudinally opposite the root end 26, as well as a leading edge 30 and a trailing edge 32 located opposite one another across the width of the blade 24. Construction of the blade 24 includes, as described more fully below, the adjoining of first and second shells 40, 42 to one another and to a centrally-located spar 44 that provides the primary structural aspect of the blade 24. As best illustrated in FIGS. 2 and 3A-3D, the blade 24 has a varying cross-sectional profile along its length. In particular, the cross-sectional profile of the blade 24 at the root end 26 (FIG. 3A) has a generally round or circular shape, which facilitates coupling of the blade 24 to the central hub 20.

Figure 3A:
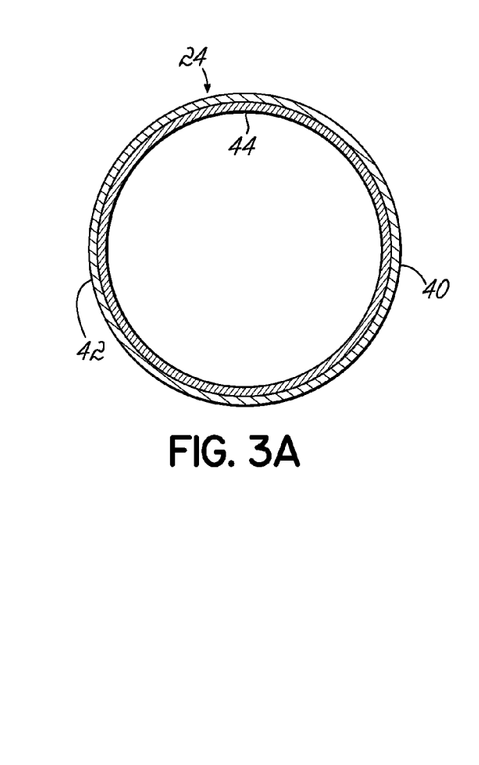
FIG. 3A is a cross-sectional view taking generally along line 3A-3A of FIG. 2.
Figure 3B:
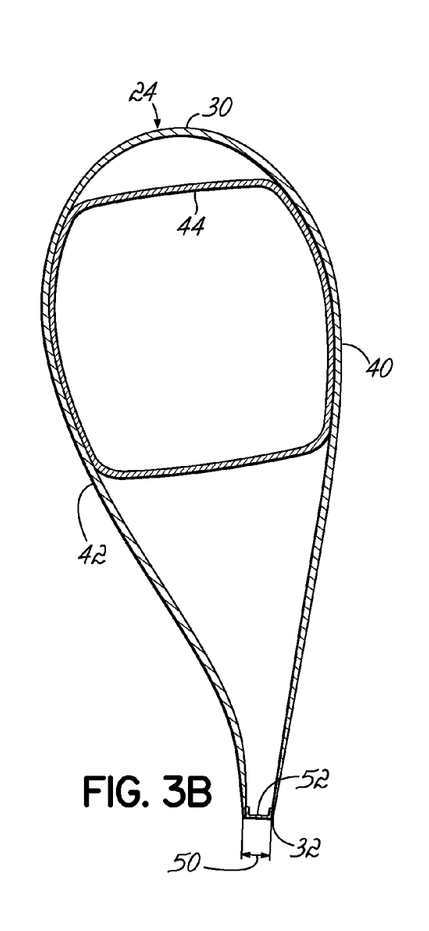
FIG. 3B is a cross-sectional view taken generally along line 3B-3B of FIG. 2.
Figure 3C:
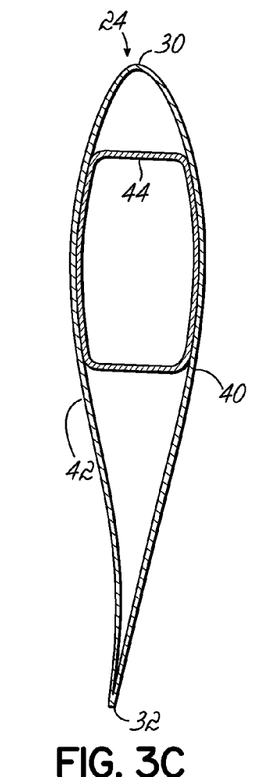
FIG. 3C is a cross-sectional view taken generally along line 3C-3C of FIG. 2.
Figure 3D:
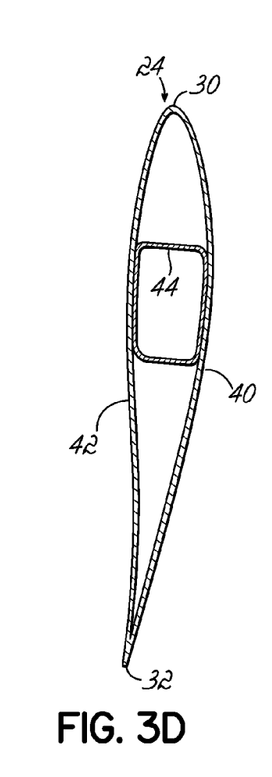
FIG. 3D is a cross-sectional view taken generally along line 3D-3D of FIG. 2.

FIG. 3B shows the general shape of the cross-sectional profile of the blade 24 along approximately one third of the length of the blade 24 starting at the root end 26. As that figure shows, the shells 40, 42 define a gap 50 between them at the trailing edge 32 in that first region of the blade 24. In this first region, a trailing edge component 52 is coupled to the two shells 40, 42 at the trailing edge 32 to yield a closed cross-sectional profile of the blade 24. Beyond this first region is a second region where no gap is formed and the shells 40 and 42 meet at the trailing edge 32. FIGS. 3C and 3D illustrate the cross-sectional profile of the blade 24 at two other positions along its longitudinal extent and in this second region. These two figures illustrate the shells 40, 42 being directly adjoined to one another at the trailing edge 32, and therefore not requiring coupling of a trailing edge component thereto.

Figure 4A:
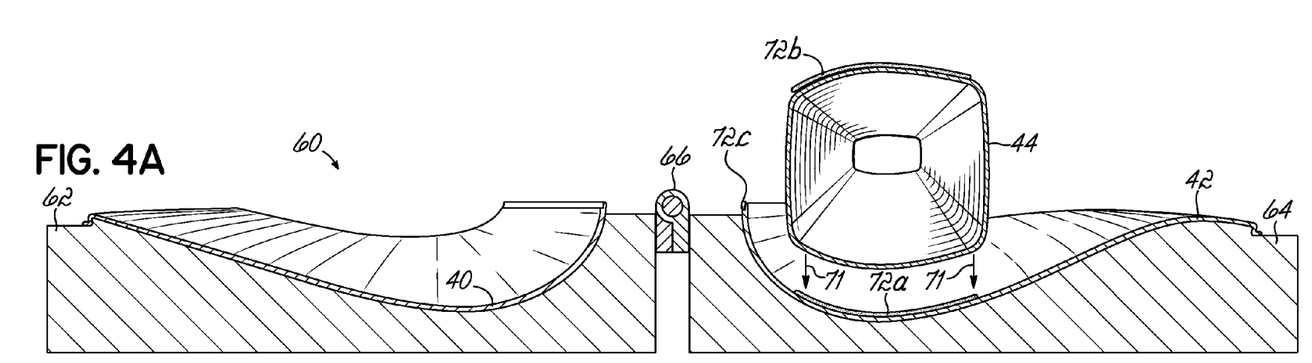
FIG. 4A is a schematic representation of an apparatus for constructing the blade of FIG. 2.
Figure 4B:
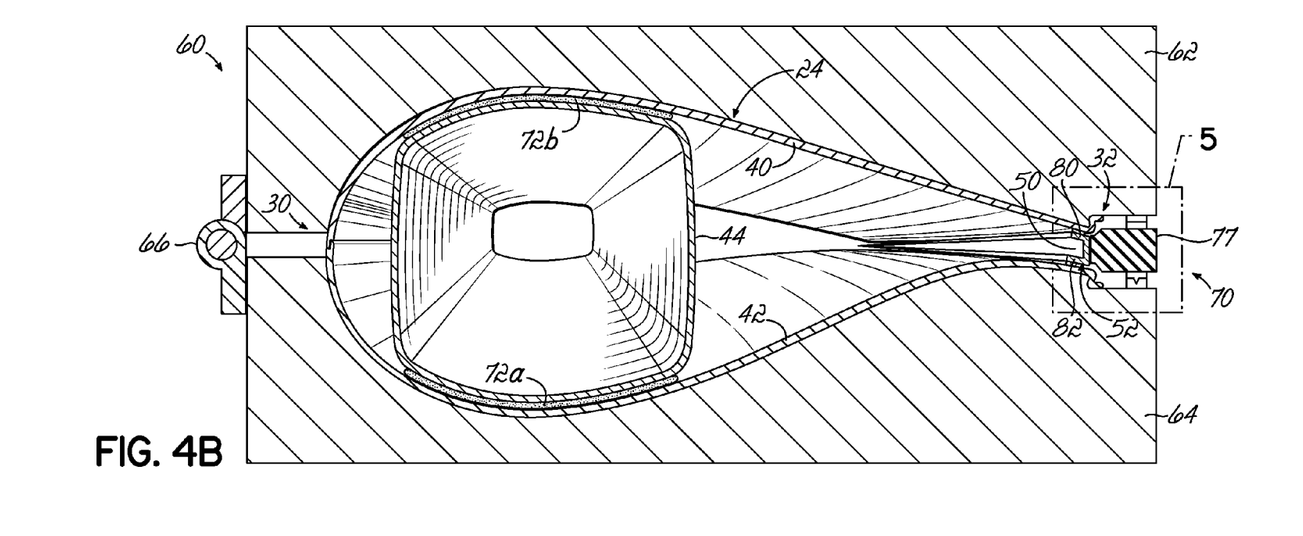
FIG. 4B is a schematic representation of the apparatus of FIG. 4A in a closed position.

FIGS. 4A and 4B illustrate an exemplary apparatus and method for fabricating one of the blades 24. In particular, these figures illustrate an apparatus and method for forming that portion of the blade 24 having a gap 50 between the shells 40, 42. The exemplary apparatus, generally designated by the numeral 60, includes a pair of mold halves 62, 64 that are pivotally movable relative to one another through a connecting hinge 66, and a trailing edge positioning device 70 configured to couple a trailing edge component 52 to the shells 40, 42, to thereby close the gap 50. FIG. 4A illustrates the mold halves 62, 64 in an open position, with their respective interiors facing in the same general direction (e.g., upwards). A step in the exemplary process for forming the blade 24 includes positioning a suitably chosen material to make up the shells 40, 42 such as, and without limitation, fiberglass, into the mold halves 62, 64. In this regard, the material may be laid or placed into each of the mold halves 62, 64 through generally known processes. In order for the shells 40, 42 to attain their desired shape, a membrane or substrate (not shown) may be positioned in the mold halves 62, 64 over the material, and a vacuum device may be actuated so as to direct the membrane or substrate against the interior surfaces of the mold halves 62, 64, thereby trapping the material in between. The negative pressure exerted by the vacuum device (e.g., vacuum bag) yields the desired thickness of the shells 40, 42. Once the material making up the shells 40, 42 cures, i.e., once the material reaches a suitable solid or semi-solid state, the membrane or substrate may be removed.

Following formation of shells 40, 42, the spar 44 is then placed into one of the mold halves 62, 64 and coupled to one of the corresponding shells 40, 42. In the illustrated embodiment, the spar 44 is shown being coupled (arrows 71) to the shell 42 supported by mold half 64, although it is contemplated that it may instead be coupled to the shell 40 supported by the other mold half 62. Coupling of the spar 44 to the shell 42 includes the bonding of two confronting surfaces respectively associated with the spar 44 and shell 42 through a first adhesive element 72a.

A second adhesive element 72b is then applied on a surface of the spar 44 opposite the first adhesive element 72a or, alternatively, onto a surface of the other shell 40, such that, when the mold halves 62, 64 are brought together, i.e., closed (FIG. 4B), the spar 44 is also coupled to the other shell 40. Once the adhesive elements 72a, 72b are allowed to cure, the spar 44 is adhesively coupled to both of the shells 40, 42. As noted above, the spar 44 lends structural rigidity and integrity to the formed blade 24. When the mold halves 62, 64 are brought together, an adhesive element 72c is applied between overlapping portions of the shells 40, 42 to thereby define an integral leading edge 30 of the blade 24.

Figure 5:
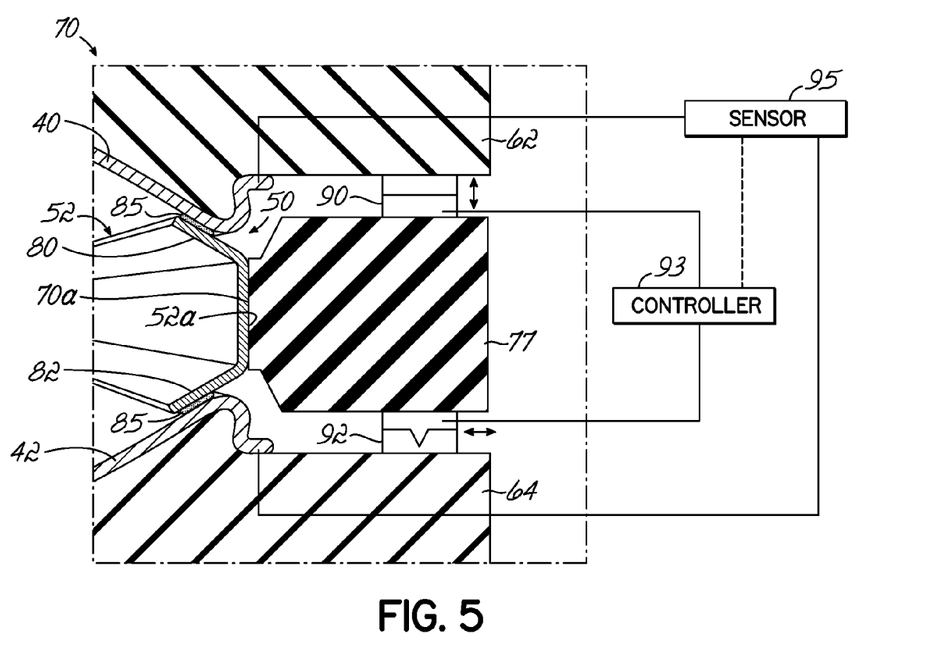
FIG. 5 is an enlarged view of the enclosed area 5 of FIG. 4B.

With particular reference to FIG. 4B, and further referring to FIG. 5, the exemplary process for forming the blade 24 includes use of a trailing edge positioning device 70 to couple the trailing edge component 52 to the two shells 40, 42. In this regard, the trailing edge positioning device 70 causes the trailing edge component 52 to engage the shells 40, 42 as the mold halves 62, 64 are brought together (i.e., closed). More specifically, the trailing edge component 52 is secured to a trailing edge engaging element 77 of the positioning device 70 through suitably chosen securing elements (not shown) such as clamps or a vacuum element and is then brought into contact with the shells 40, 42. Prior to engagement of the trailing edge component 52 with the shells 40, 42, adhesive 85 is applied onto the surfaces of respective flange portions 80, 82 of the trailing edge component 52. Alternatively, adhesive 85 may be applied onto the surfaces of the shells 40, 42 that are calculated to come into contact with the flange portions 80, 82. Once the adhesive 85 is applied, the mold halves 62, 64 are moved into full engagement with one another (i.e., they are fully closed) so that the adhesive 85 bonds the flange portions 80, 82 to the surfaces of the shells 40, 42 that are in confronting relationship with the flange portions 80, 82.

Along with movement of the mold halves 62, 64 toward a position of full engagement with one another (i.e., fully closing the mold halves 62, 64), the trailing edge engaging element 77 of the positioning device 70 is directed to accommodate the trailing edge component 52 so that the component 52 attains a desired position relative to the shells 40, 42. More specifically, the positioning device 70 includes a vertical adjustment mechanism 90 and a horizontal adjustment mechanism 92, both operatively coupled to the trailing edge engaging element 77, and which respectively adjust the vertical and horizontal positions of the trailing edge engaging element 77 and, therefore, the vertical and horizontal positions of the trailing edge component 52 relative to the shells 40, 42. Such vertical and horizontal adjustment mechanisms 90, 92 are generally known in the art and therefore are not described in detail herein and are shown schematically in FIGS. 5 and 6. Notwithstanding the above, these adjustment mechanisms 90, 92 may include, without limitation, sliding guides, jacking bolts, set screws, and others. Once the desired position of the trailing edge component 52 is attained, the adhesive 85 is allowed to cure, so as to bond the flange portions 80, 82 to corresponding confronting surfaces of the shells 40, 42, thereby completing construction of the trailing edge portion 32 of the blade 24.

In one embodiment, the positioning device 70 is permanently mounted onto one of the mold halves 62, 64. For example, the device 70 may be permanently mounted onto mold half 64 through one or more sliding guides or other type of horizontal or vertical adjustment mechanism. In operation, the trailing edge component 52 would be brought into secure engagement with the engagement element 77 and the flange portion 82 of the component 52 is coupled to the corresponding surface of the shell 42 supported by the mold 64. The other mold half 62 is then pivoted about the hinge 66 and closed over the mold half 64, so that the flange portion 80 of component 52 is brought into engagement with a corresponding surface of the shell 40 that is supported by the mold half 62. A second horizontal or vertical adjustment mechanism is then used to adjust the position of the flange portion 80 relative to the shell 40 and the flange portion 80 is coupled (e.g., adhesively) to the a corresponding surface of the shell 40.

In another embodiment, the engagement element 77 is releasably coupled to one or both of the mold halves 62, 64, such as mold half 64, for example, through one or more releasable coupling elements (not shown) that form part of the apparatus 60 and which may be permanently coupled to the either of the mold halves 62, 64. In that embodiment, construction of the blade 74 includes decoupling the engagement element 77 from the mold half 64, and securely supporting the trailing edge component 52 with the engagement element 77 away from the mold half 64. Once the component 52 is secured to the engagement element 77, adhesive may be applied to the flange portions 80, 82, as described above, and the engagement element 77 may be coupled again to the mold half 64 through the one or more releasable coupling elements. The other mold half 62 would then be closed over the mold half 64 and the process for coupling the component 52 to the shells 40, 42 would proceed as in the other embodiments described above. Alternatively, once the trailing edge component 52 is secured to the engagement element 77 away from the mold half 64 (and away from the mold half 62), the mold half 62 may be closed over the mold half 64 and, subsequently or concurrently, the engagement element 77 may be recoupled to one or both of the mold halves 62, 64 so as to bring the flange portions 80, 82 into engagement with the corresponding surfaces of the shells 40, 42.

In a specific embodiment, and particularly referring to FIG. 5, the positioning device 70 includes a schematically-depicted controller 93 that is operatively coupled to one or both of the adjustment mechanisms 90, 92 and to a sensor 95. The sensor 95 is configured to detect a position of the shells 40, 42 relative to the trailing edge component 52 and generate a signal associated with the sensed position to the controller 93. In response to the signal generated by the sensor 95, the controller 93 is configured to automatically direct one or both of the adjustment mechanisms 90, 92 to adjust the position of the engagement element 77 and, thereby, the position of the trailing edge component 52 so as to attain the desired position relative to the shells 40, 42. In an alternative embodiment and as explained above, the positioning device 70 may include slide guides, jacking bolts, set screws or bolts and/or other devices that provide manual adjustments.

As used herein, the terms "vertical" and "horizontal," as well as respective derivatives thereof, are not intended to be limiting, and refer to the orientations depicted in the figures. In that regard, for example, the term "vertical" refers to the direction that is generally perpendicular to the longitudinal extension of the blade 24 and also generally perpendicular to the width (leading edge-trailing edge direction) of the blade 24. While the embodiment illustrated in the figures and described herein include vertical and horizontal adjustment mechanisms, it is contemplated that the apparatus 60 may additionally include an adjustment mechanism configured to accommodate the position of the engaging element 77 in the longitudinal direction of the blade 24 (i.e., in and out of the page, relative to the orientation shown in FIGS. 5-7).

Figure 6:
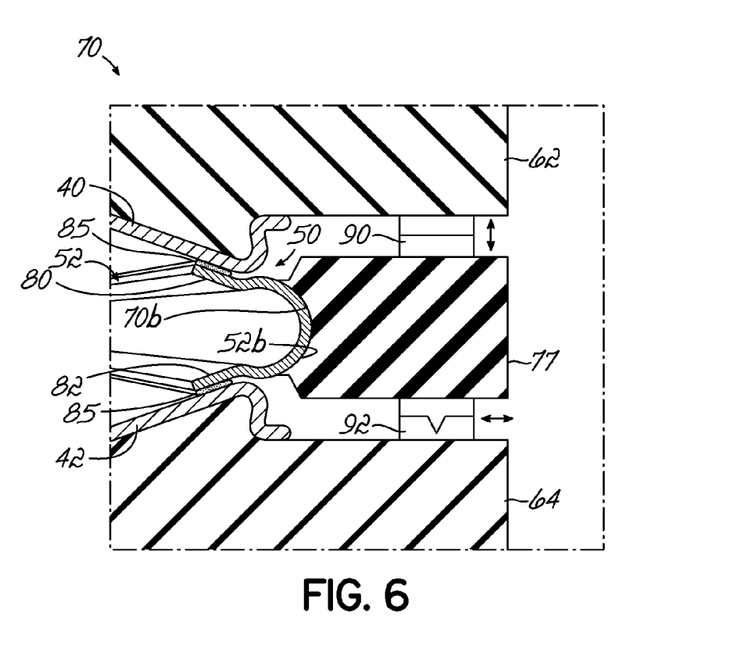
FIG. 6 is a view similar to FIG. 5 illustrating a different portion of the apparatus and trailing edge component shown in FIG. 5.
Figure 7:
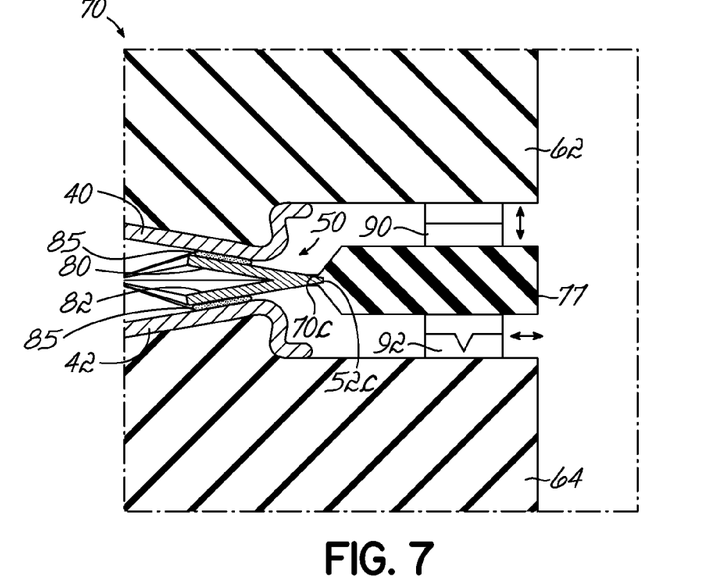
FIG. 7 is a view similar to FIGS. 5 and 6 illustrating yet a different portion of the apparatus and trailing edge component shown in FIGS. 5 and 6.

With continued reference to FIGS. 5-7, the cross-sectional profile of the blade 24 (FIGS. 2 and 3A-3D) along the length thereof that includes trailing edge component 52 may vary along its length. Accordingly, the gap between shells 40, 42 may not be constant, but may vary in the longitudinal direction. As a result, the cross-sectional profile of the trailing edge component 52 may vary so as to provide a gradual transition from the portions of the blade 24 in which the gap 50 is relatively wide (i.e., proximate the root end 26) to portions of the blade 24 in which the gap is relatively narrow (i.e., proximate the portion of the blade 24 illustrated at FIG. 3C in which the shells 40, 42 meet and are bonded to each other). To this end, the trailing edge component 52 is relatively wide at some portions along its length (FIG. 5), not as wide at other portions (FIG. 6), and relatively narrow at yet other portions (FIG. 7). Additionally, the cross-sectional shape of the trailing edge component 52 may also change along its length having, for example, a generally flat tip surface 52a (FIG. 5), a generally rounded tip surface 52b (FIG. 6), and a generally V-shaped tip surface 52c (FIG. 7).

In one embodiment of the invention, the shape of the trailing edge engaging element 77 of the positioning device 70 also varies along the length of the positioning device 70 so as to accommodate the varying cross-sectional shape of the trailing edge component 52. More specifically, in that embodiment, the positioning device 70 has a generally flat engaging surface 70a that conforms to the generally flat tip surface 52a (FIG. 5), an arcuate engaging surface 70b that conforms to the generally rounded tip surface 52b (FIG. 6), and a generally V-shaped engaging surface 70c that conforms to the generally V-shaped tip surface 52c (FIG. 7).

Figure 2:
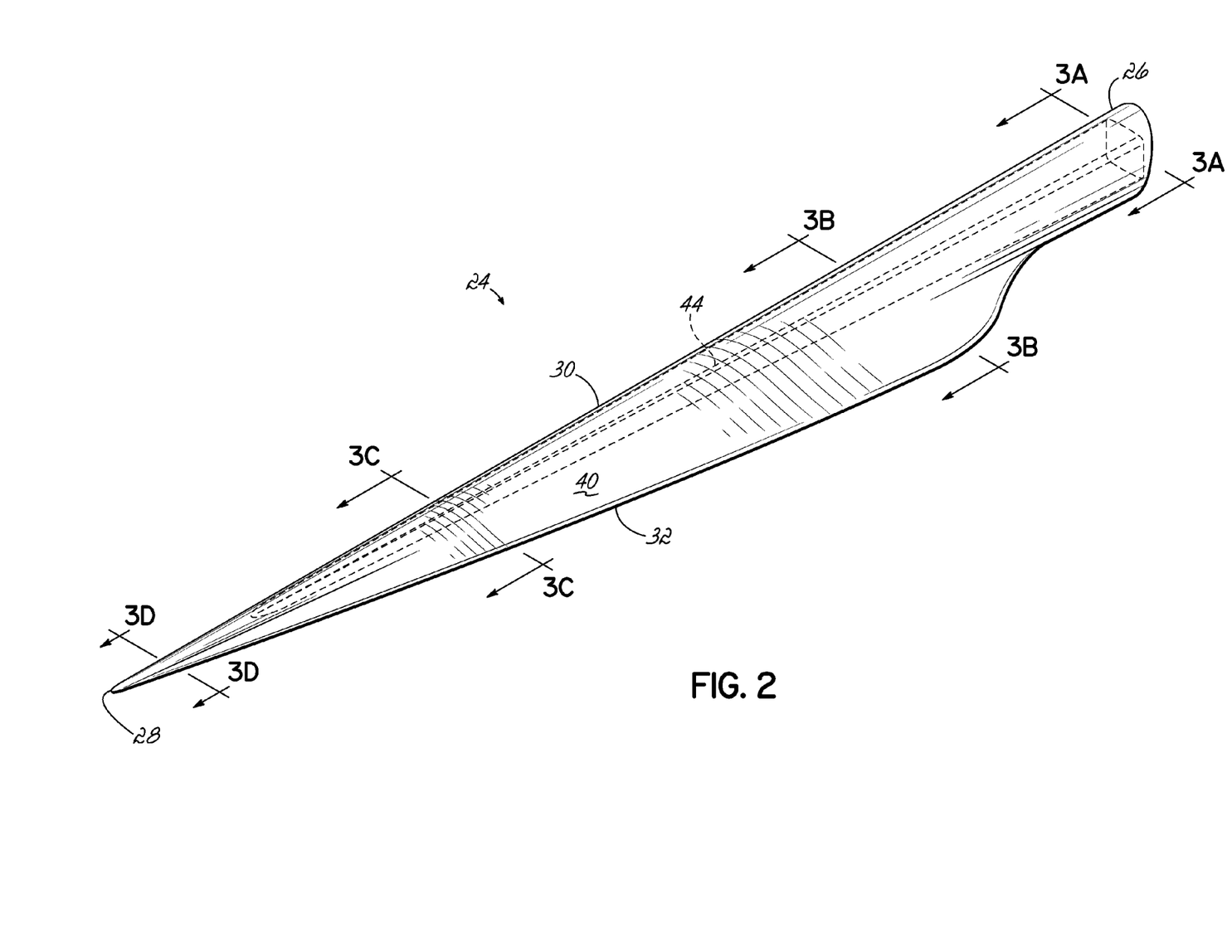
FIG. 2 is a perspective view of a blade of the wind turbine of FIG. 1.
Figure 8:
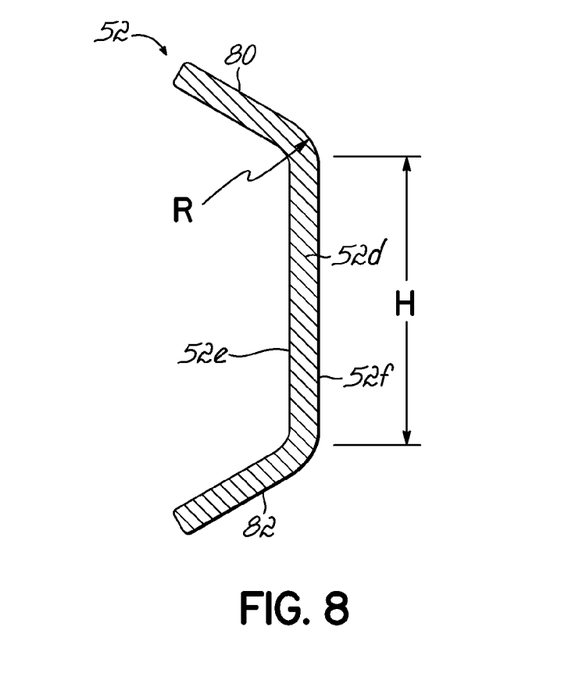
FIG. 8 is a cross-sectional view of a trailing edge component in accordance with one embodiment of the invention.

With reference to FIG. 8, an exemplary trailing edge component 52 is illustrated, which includes a central member 52d and a pair of flange portions 80, 82 coupled to each end of the central member 52d. The flange portions 80, 82 extend from the central member 52d toward the blade 24 and are oriented at respective angles so as to generally conform to the orientation of the shells 40, 42 to which the trailing edge component 52 is coupled to define the trailing edge 32 of the blade 24 (FIG. 2). The central member 52d also includes a generally flat surface 52e configured to face the blade 24 and an oppositely disposed generally flat surface 52f configured to face away from the blade 24. The trailing edge component 52 in that embodiment has a suitably chosen radius of curvature R at the juncture between the flat surface 52f and each of the flange portions 80, 82. In some embodiments, the radius of curvature R is chosen so as to be at least about 10% of the height H of the central member 52d and, particularly, of the flat surface 52f. In one specific embodiment, the radius of curvature R is chosen such that the ratio of the radius R to the height H of the flat surface 52f ("the R/H ratio") is about 20%. Inasmuch as the cross-sectional shape of the trailing edge component 52 varies along its length (i.e., along the longitudinal extension of the blade 24), the radius of curvature R may be adjusted, for example, such that the R/H ratio is about 20% when the height H is below about 250 mm or such that the radius R is about 50 mm when the height H is less than about 50 mm. Thus, it may be that only a portion of the trailing edge component 52 has an R/H ratio of about 20%. Other portions, for example, may be less than about 10%.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of the general inventive concept.

What is claimed is:

1. An apparatus for forming a trailing edge of a wind turbine blade having first and second shells, the first and second shells defining a gap there between, comprising:
   a first mold component adapted to form the first shell;
   a trailing edge positioning device including an engaging element configured to securely support a trailing edge component to be coupled to the first and second shells to thereby close the gap, said engaging element being coupled to said first mold component; and
   a second mold component adapted to form the second shell and coupled to said first mold component, said first and second mold components having a closed position in which the first and second shells are closed over one another to define a generally closed profile of the wind turbine blade, the trailing edge component configured to be in contact with the first and second shells when in the closed position,
   wherein said first and second mold components are pivotally coupled to one another.

2. The apparatus according to claim 1, wherein said engaging element is positioned between said first and second mold components in said closed position.

3. The apparatus according to claim 1, wherein said engaging element is positioned outside said first and second mold components in said closed position.

4. The apparatus according to claim 1, wherein said engaging element is releasably coupled to said first mold component.

5. The apparatus according to claim 1, further comprising:
   a first adjustment mechanism operatively coupled to said engaging element for positioning the trailing edge component relative to the first and second shells of the wind turbine blade.

6. The apparatus according to claim 5, wherein said first adjustment mechanism is configured to control a position of the trailing edge component along a first direction transverse to a longitudinal extension of the wind turbine blade.

7. The apparatus according to claim 6, further comprising:
   a second adjustment mechanism operatively coupled to said engaging element and configured to control a position of the trailing edge component along a second direction transverse to the first direction.

8. The apparatus according to claim 5, wherein said first adjustment mechanism is manual.

9. The apparatus according to claim 8, wherein said first adjustment mechanism includes one of a sliding guide, a jacking bolt, or a set screw.

10. The apparatus according to claim 1, wherein said engaging element includes one of a vacuum element or a clamp for securely supporting the trailing edge component relative thereto.

11. The apparatus according to claim 1, wherein said engaging element has a surface configured to conform to the shape of the trailing edge component, said surface being one of arcuate, generally flat, or generally V-shaped.

12. The apparatus according to claim 1, wherein said engaging element has a varying cross-sectional profile along the length thereof.

13. A method for closing a gap between first and second shells at the trailing edge of a wind turbine blade, the method comprising:
   forming the first shell in a first mold component;
   supporting a trailing edge component of the wind turbine blade with an engaging element of a trailing edge positioning device, the trailing edge component to be coupled to the first and second shells to thereby close the gap, the engaging element being coupled to the first mold component;
   forming the second shell in a second mold component; and
   moving the second mold component over the first mold component to thereby define a closed position in which the first and second shells are closed over one another to define a generally closed profile of the wind turbine blade, the trailing edge component being in contact with the first and second shells when in the closed position,
   wherein moving the second mold component includes pivotally moving the first and second mold components relative to one another.

14. The method according to claim 13, further comprising:
adjusting a position of the trailing edge component by actuating an adjustment mechanism of the trailing edge positioning device.

15. The method according to claim 13, further comprising:
securing the trailing edge component relative to the engaging element while the engaging element is coupled to the first mold component.

16. The method according to claim 13, further comprising:
securing the trailing edge component relative to the engaging element while the engaging element is decoupled from the first mold component.

17. The apparatus according to claim 1, wherein the trailing edge component for closing the gap, comprises:
a central member having a predetermined height;
a pair of flange portion members coupled to respective ends of said central member; and
a pair of curved portions at the intersection of said central member and each of said flange portion members, at least one of said curved portion members having a radius of curvature, along a longitudinal portion of the trailing edge component, that is at least about 10% of said predetermined height of said central member.

18. The apparatus according to claim 17, wherein said radius of curvature is at least about 20% of said predetermined height of said central member.

19. The apparatus according to claim 17, wherein the trailing edge component extends along a longitudinal dimension of the wind turbine blade, the trailing edge component having a varying cross-sectional profile along said longitudinal dimension.

* * * * *